(12) United States Patent
Yang et al.

(10) Patent No.: US 9,142,251 B2
(45) Date of Patent: Sep. 22, 2015

(54) SYSTEMS AND METHODS FOR END OF FRAGMENT MARKER BASED DATA ALIGNMENT

(71) Applicant: LSI Corporation, San Jose, CA (US)

(72) Inventors: Yuqing Yang, Shanghai (CN); Shaohua Yang, San Jose, CA (US); Lei Wang, Shanghai (CN); Gu Zhao, Shanghai (CN)

(73) Assignee: Avago Technologies General IP (Singapore) PTE. LTD., Singapore (SG)

( * ) Notice: Subject to any disclaimer, the term of this patent is extended or adjusted under 35 U.S.C. 154(b) by 41 days.

(21) Appl. No.: 14/177,496

(22) Filed: Feb. 11, 2014

(65) Prior Publication Data

US 2015/0228304 A1 Aug. 13, 2015

(30) Foreign Application Priority Data

Feb. 10, 2014 (CN) .............. 2014 1 045856

(51) Int. Cl.
*G11B 5/09* (2006.01)
*G11B 20/10* (2006.01)
*G11B 5/596* (2006.01)

(52) U.S. Cl.
CPC ...... *G11B 20/10222* (2013.01); *G11B 5/59655* (2013.01); *G11B 20/10296* (2013.01); *G11B 2220/2516* (2013.01)

(58) Field of Classification Search
CPC ............... G11B 20/10203; G11B 20/10296; G11B 2220/2516; G11B 5/09; G11B 20/1217; G11B 2020/1287; G11B 5/59655; G11B 20/14; G11B 5/59666; G11B 5/59688; G11B 5/59616; G11B 20/1024; G11B 20/10009; G06F 11/263

USPC ................ 360/39, 51, 43; 714/798
See application file for complete search history.

(56) References Cited

U.S. PATENT DOCUMENTS

| | | |
|---|---|---|
| 5,222,069 A | 6/1993 | Chevalley |
| 5,731,922 A | 3/1998 | Yamasaki |
| 5,938,790 A | 8/1999 | Marrow |
| 6,029,264 A | 2/2000 | Kobayashi |
| 6,272,659 B1 | 8/2001 | Zook |
| 6,438,724 B1 | 8/2002 | Cox |
| 6,446,234 B1 | 9/2002 | Cox |
| 6,493,846 B1 | 12/2002 | Kondo |
| 6,694,477 B1 | 2/2004 | Lee |
| 6,810,094 B1 | 10/2004 | Lu |
| 6,847,601 B2 | 1/2005 | Kanai |
| 7,178,086 B2 | 2/2007 | Hassner |
| 7,395,491 B2 | 7/2008 | Chen |

(Continued)

FOREIGN PATENT DOCUMENTS

JP 06046406 2/1994

OTHER PUBLICATIONS

Kang et al., "A Two-Stage Iterative Decoding of LDPC Codes for Lowering Error Floors", IEEE GLOBECOM Proceedings, 1088-1091 (2008).

Lin et al "An efficient VLSI Architecture for non binary LDPC decoders"—IEEE Transaction on Circuits and Systems II vol. 57, Issue 1 (Jan. 2010) pp. 51-55.

(Continued)

*Primary Examiner* — Ali Neyzari

(74) *Attorney, Agent, or Firm* — Hamilton DeSanctis & Cha

(57) ABSTRACT

Systems and method relating generally to data processing, and more particularly to systems and methods for data synchronization and detection.

20 Claims, 5 Drawing Sheets

(56) References Cited

U.S. PATENT DOCUMENTS

| | | | |
|---|---|---|---|
| 7,685,497 B2 | 3/2010 | Kons | |
| 8,230,292 B2 | 7/2012 | Fujiwara | |
| 8,862,972 B2 * | 10/2014 | Seago et al. | 714/795 |
| 8,976,475 B1 * | 3/2015 | Li et al. | 360/48 |
| 2005/0166132 A1 | 7/2005 | Shen et al. | |
| 2007/0201632 A1 | 8/2007 | Ionescu | |
| 2010/0042890 A1 | 2/2010 | Gunnam | |
| 2010/0287436 A1 | 11/2010 | Lastras-Montano | |
| 2011/0109773 A1 | 5/2011 | Dekel | |
| 2011/0161774 A1 | 6/2011 | Shin et al. | |
| 2011/0164745 A1 | 7/2011 | Marzetta et al. | |
| 2012/0005551 A1 | 1/2012 | Gunnam et al. | |
| 2012/0288003 A1 | 11/2012 | Do et al. | |
| 2013/0007570 A1 | 1/2013 | Seago | |
| 2013/0024163 A1 | 1/2013 | Xia | |
| 2013/0086446 A1 | 4/2013 | Yeung et al. | |
| 2013/0111290 A1 * | 5/2013 | Zhang et al. | 714/752 |
| 2013/0198580 A1 * | 8/2013 | Chen et al. | 714/752 |
| 2013/0201942 A1 * | 8/2013 | Kim et al. | 370/329 |
| 2013/0254619 A1 * | 9/2013 | Zhang et al. | 714/755 |
| 2013/0283113 A1 * | 10/2013 | Yang et al. | 714/746 |
| 2013/0283114 A1 * | 10/2013 | Yang et al. | 714/752 |
| 2014/0115430 A1 * | 4/2014 | Zhang | 714/795 |
| 2014/0185159 A1 * | 7/2014 | Yang et al. | 360/51 |
| 2015/0062732 A1 * | 3/2015 | Aravind et al. | 360/32 |
| 2015/0062738 A1 * | 3/2015 | Yang | 360/48 |
| 2015/0121173 A1 * | 4/2015 | Yang et al. | 714/773 |

OTHER PUBLICATIONS

Perisa et al "Frequency Offset Estimation Based on Phase Offsets Between Sample Correlations" Dept. of Info. Tech. University of Ulm 2005.

U.S. Appl. No. 14/082,261, Unpublished (filed Nov. 18, 2013) (Shaohua Yang).

U.S. Appl. No. 14/025,356, Unpublished (filed Sep. 12, 2013) (Nayak Ratnakar Aravind).

U.S. Appl. No. 14/025,468, Unpublished (filed Sep. 12, 2013) (Shaohua Yang).

U.S. Appl. No. 13/654,417, Unpublished (filed Oct. 18, 2012) (Fan Zhang).

U.S. Appl. No. 13/766,857, Unpublished (filed Feb. 14, 2013) (Shaohua Yang).

U.S. Appl. No. 13/707,898, Unpublished (filed Dec. 7, 2012) (Razmik Karabed).

U.S. Appl. No. 13/426,722, Unpublished (filed Mar. 22, 2012) (Fan Zhang).

U.S. Appl. No. 13/452,733, Unpublished (filed Apr. 20, 2012) (Shaohua Yang).

U.S. Appl. No. 13/450,289, Unpublished (filed Apr. 18, 2012) (Shaohua Yang).

U.S. Appl. No. 13/284,754, Unpublished (filed Oct. 28, 2011) (Fan Zhang).

U.S. Appl. No. 13/363,751, Unpublished (filed Feb. 1, 2012) (Lei Chen).

* cited by examiner

SYSTEMS AND METHODS FOR END OF FRAGMENT MARKER BASED DATA ALIGNMENT

CROSS REFERENCE TO RELATED APPLICATIONS

The present application claims priority to Chinese Pat. App. No. 201410045856.0 entitled "Systems and Methods for End of Fragment Marker Based Data Alignment", and filed Feb. 10, 2014 by Yang et al. The entirety of the aforementioned provisional patent application is incorporated herein by reference for all purposes.

FIELD OF THE INVENTION

The present inventions are related to systems and methods for data processing, and more particularly to systems and methods for data synchronization and detection.

BACKGROUND

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by an ability to recover the originally provided data. Such recovery often involves detection of a sync-mark that indicates a location and timing of user data to be recovered. In some cases, the sync mark cannot be properly recovered resulting in data losses.

Hence, for at least the aforementioned reasons, there exists a need in the art for advanced systems and methods for data processing.

SUMMARY

The present inventions are related to systems and methods for data processing, and more particularly to systems and methods for data synchronization and detection.

Some embodiments of the present invention provide data processing systems that include a sync mark identification circuit and an alignment circuit. The sync mark identification circuit is operable to: identify a sync mark pattern in a data input within a first window of time to yield a first sync found output, where the sync mark within the first window of time is identified when a comparison metric is less than a threshold value; and identify the sync mark pattern in the data input within a second window of time to yield a second sync found output, where the sync mark within the second window of time is identified as a location in the data input where the comparison metric is the lowest value within the second window and is less than the threshold value. The alignment circuit is operable to align a processing input derived from the data input based upon a combination of the first sync found output and the second sync found output to yield an aligned output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1A:
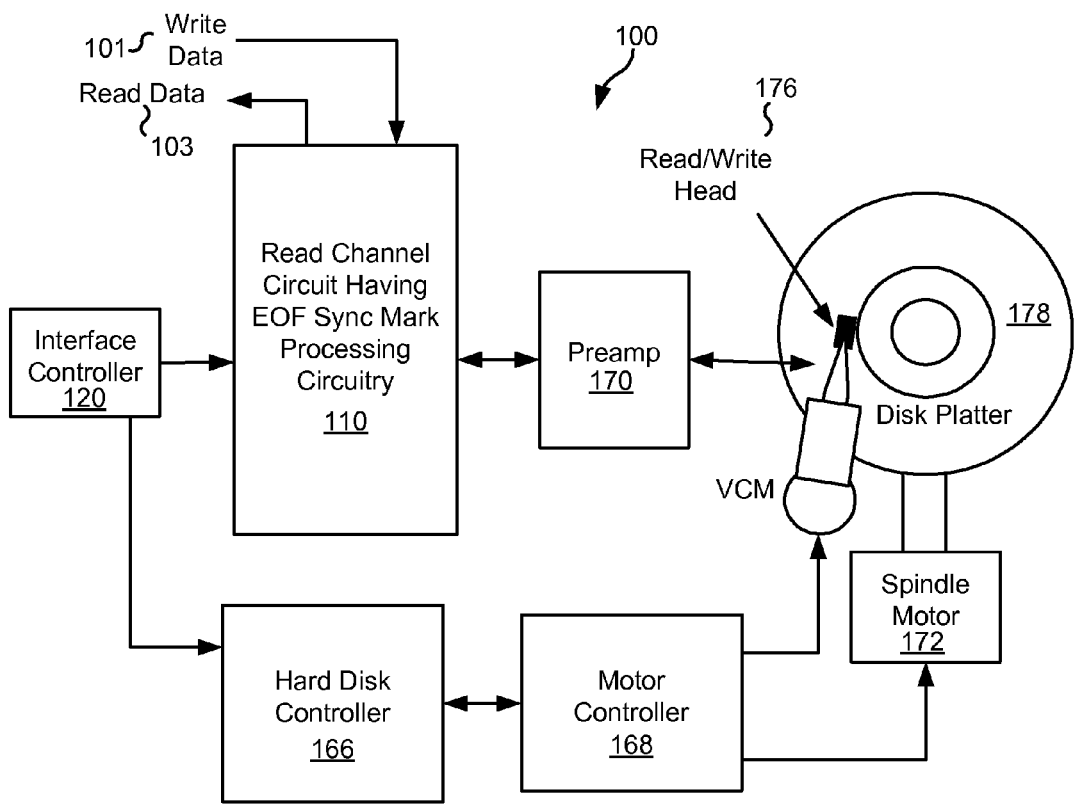
FIG. 1a shows a storage device including a read channel circuit having end of fragment synchronization mark processing circuitry in accordance with various embodiments of the present invention.

The present inventions are related to systems and methods for data processing, and more particularly to systems and methods for data synchronization and detection.

Some embodiments of the present invention provide data processing systems that include a sync mark identification circuit and an alignment circuit. The sync mark identification circuit is operable to: identify a sync mark pattern in a data input within a first window of time to yield a first sync found output, where the sync mark within the first window of time is identified when a comparison metric is less than a threshold value; and identify the sync mark pattern in the data input within a second window of time to yield a second sync found output, where the sync mark within the second window of time is identified as a location in the data input where the comparison metric is the lowest value within the second window and is less than the threshold value. The alignment circuit is operable to align a processing input derived from the data input based upon a combination of the first sync found output and the second sync found output to yield an aligned output.

In some cases, the data processing system is implemented as part of a storage device. In other cases, the data processing system is implemented as part of a communication device. In various cases, the data processing system is implemented as part of an integrated circuit. IN some instances of the aforementioned embodiments, the first window of time corresponds to a series of data preceding a data fragment, and the second window of time corresponds to a series of data following the data fragment.

In some instances of the aforementioned embodiments, the data processing system further includes a data processing circuit operable to apply a data processing algorithm to the aligned output to yield a data output. In various instances of the aforementioned embodiments, the data processing system further includes an equalizer circuit operable to equalize the data input to yield the processing input. In other instances, the processing input is the same as the data input. In particular instances of the aforementioned embodiments, the sync mark identification circuit includes a Euclidean distance calculation circuit. In other particular instances, the sync mark identification circuit includes an absolute value calculation circuit.

In one or more instances of the aforementioned embodiments, the first sync found output indicates a location of a sync found and a quality of the sync found. In such instances, when the quality of the sync found is high, aligning the processing input is based only on the location of the sync found. In other such instances, when the quality of the sync found is low, aligning the processing input is based on the second sync found output and one of an end of the first window or the location of the sync found plus a defined offset. In various instances of the aforementioned embodiments, the first sync found output indicates a missing sync found, and aligning the processing input is based upon the end of the first window and the second sync found.

Other embodiments of the present invention provide methods for data processing that include: comparing a data input with a sync mark pattern to yield multiple instances of a comparison metric; comparing at least one of the multiple instances of the comparison metric within a first window of time with a threshold value; asserting a first sync found output when one of the multiple instances of the comparison metric is less than the threshold value within the first window of time; asserting a second sync found output at a location corresponding to the lowest value of the instances of the comparison metric within a second window of time where the lowest value of the instances of the comparison metric within a second window of time is less than the threshold value; and aligning a processing input derived from the data input using an alignment circuit based upon a combination of the first sync found output and the second sync found output to yield an aligned output.

Turning to FIG. 1a, a storage system 100 is shown that includes a read channel 110 having end of fragment synchronization mark processing circuitry in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In operation, data accessed from disk platter 178 is synchronized using a combination of a first synchronization mark that precedes a data fragment and a second synchronization mark that follows the data fragment. An attempt to identify each of the synchronization marks is made, and based upon whether the synchronization marks were identified and the quality of the identified synchronization marks, the data may be aligned using one or the other of the synchronization marks for processing. The data processing circuit providing the aforementioned synchronization mark detection and data alignment circuitry may be implemented similar to that discussed below in relation to FIG. 4. The data processing may be completed using a method such as that discussed in relation to FIG. 6.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 1B:
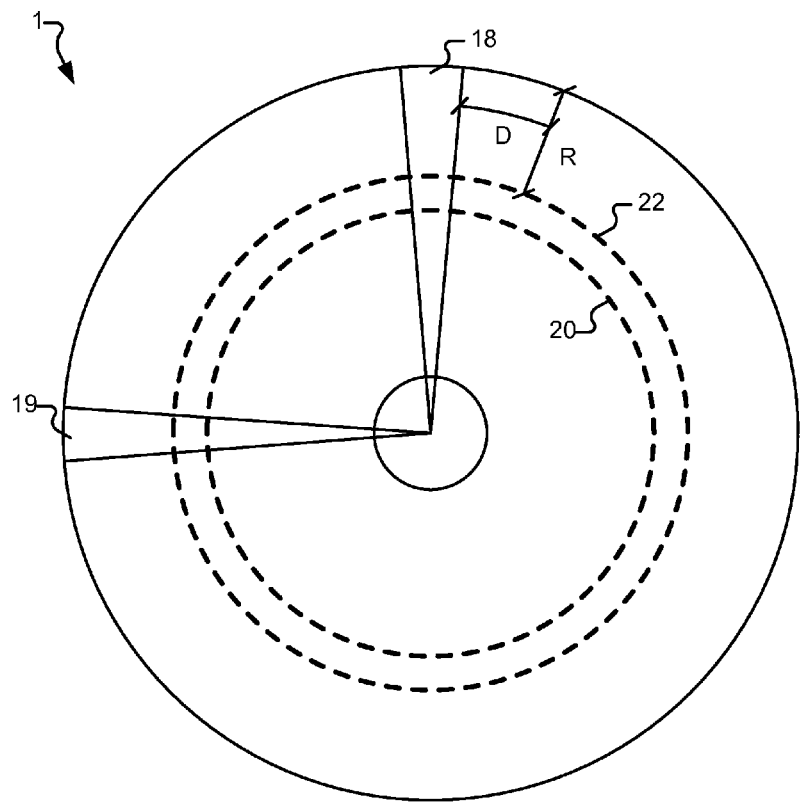
FIG. 1b is a block diagram of a magnetic storage medium and sector data scheme including end of fragment synchronization marks in accordance with some embodiments of the present invention.
Figure 1B:
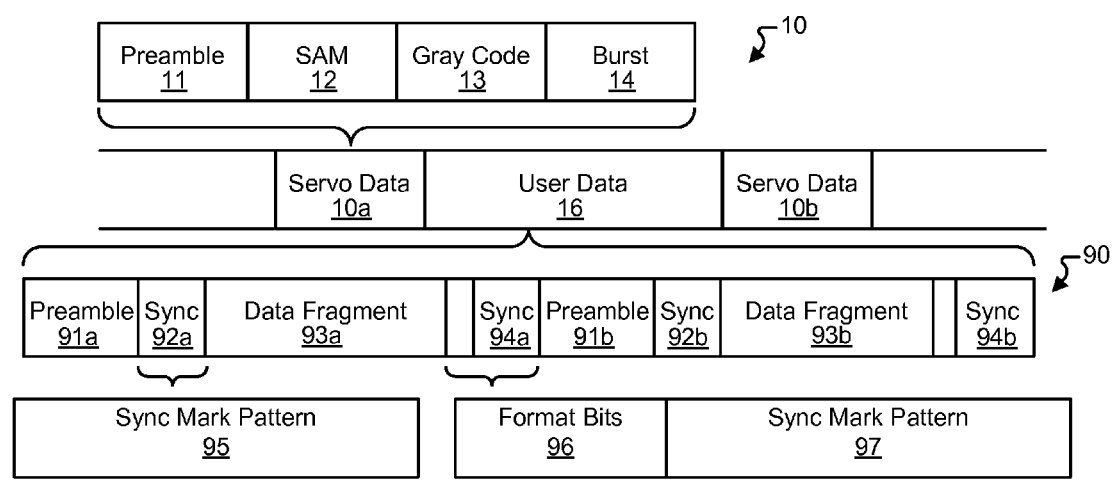

Turning to FIG. 1b, a storage medium 1 is shown with two exemplary tracks 20, 22 indicated as dashed lines. Storage medium 1 may be used in place of disk platter 178. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes one or more fragments with each fragment including a preamble 91, a sync 92, a data fragment 93, and an ending pattern having another sync 94. Preamble 91 may be, for example, a repeating series of data (e.g., '001110011100111'). In some embodiments of the present invention, preamble 91 includes a 2 T pattern (i.e., '110011001100'). Based upon the disclosure provided herein, one of ordinary skill in the art will recognize a variety of patterns that may be used for preamble 91. Sync 92 follows preamble 91, and includes a number of bits set to a predefined sync mark pattern 95. In some embodiments of the present invention, predefined sync mark pattern 95 is a specific fourteen (14) bit pattern. Based upon the disclosure provided herein, one of ordinary skill in the art will recognize a variety of patterns that may be used for sync mark pattern 95. In addition, user data region 16 includes a data fragment 93 between sync 92 and the ending pattern. Data fragment 93 includes a variety of user data. The ending pattern includes format bits 96 used to align consecutive fragments, and another sync mark pattern 97. In some embodiments of the present invention, sync mark pattern 97 is identical to sync mark pattern 95.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91, sync 92 and sync 94. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Figure 2:
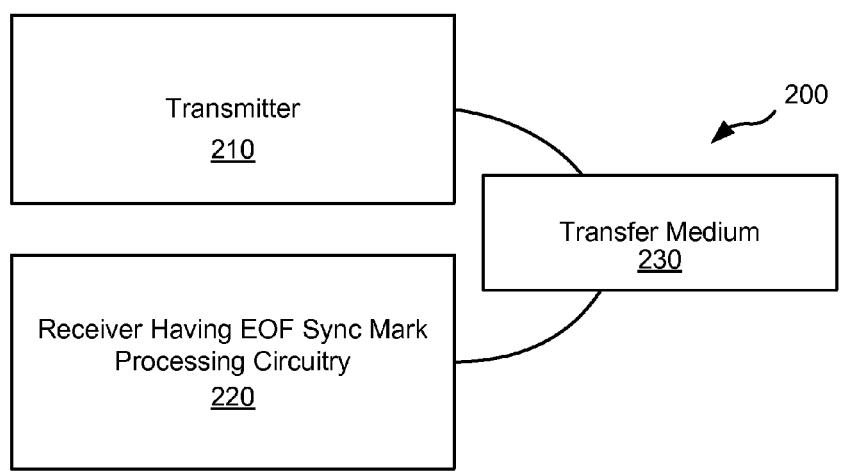
FIG. 2 shows a data transmission device including a receiver having end of fragment synchronization mark processing circuitry in accordance with various embodiments of the present invention.

Turning to FIG. 2, a data transmission system 200 including a receiver 220 having end of fragment synchronization mark processing circuitry in accordance with one or more embodiments of the present invention. A transmitter 210 transmits encoded data via a transfer medium 230 as is known in the art. The encoded data is received from transfer medium 230 by receiver 220.

In operation, data received by receiver 220 is synchronized using a combination of a first synchronization mark that precedes a data fragment and a second synchronization mark that follows the data fragment. An attempt to identify each of the synchronization marks is made, and based upon whether the synchronization marks were identified and the quality of the identified synchronization marks, the data may be aligned using one or the other of the synchronization marks for processing. The data processing circuit providing the aforementioned synchronization mark detection and data alignment circuitry may be implemented similar to that discussed below in relation to FIG. 4. The data processing may be completed using a method such as that discussed in relation to FIG. 6.

Figure 3:
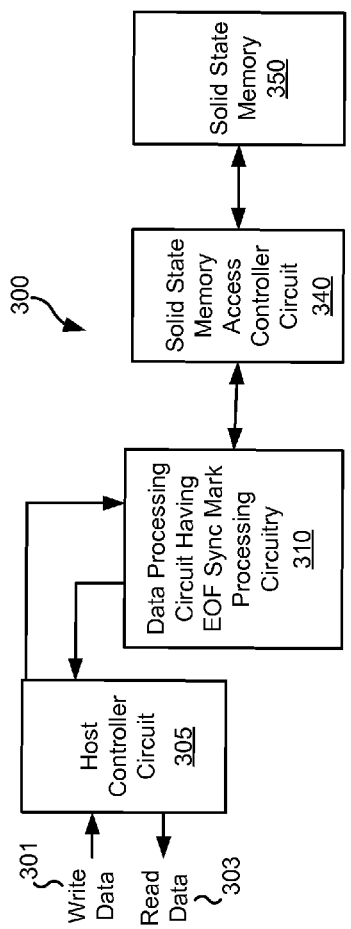
FIG. 3 shows a solid state memory circuit including a data processing circuit having end of fragment synchronization mark processing circuitry in accordance with some embodiments of the present invention.

Turning to FIG. 3, another storage system 300 is shown that includes a data processing circuit 310 having end of fragment synchronization mark processing circuitry in accordance with one or more embodiments of the present invention. A host controller circuit 305 receives data to be stored (i.e., write data 301). Solid state memory access controller circuit 340 may be any circuit known in the art that is capable of controlling access to and from a solid state memory. Solid state memory access controller circuit 340 formats the received encoded data for transfer to a solid state memory 350. Solid state memory 350 may be any solid state memory known in the art. In some embodiments of the present invention, solid state memory 350 is a flash memory. Later, when the previously written data is to be accessed from solid state memory 350, solid state memory access controller circuit 340 requests the data from solid state memory 350 and provides the requested data to data processing circuit 310. In turn, data processing circuit 310 synchronizes the received data using a combination of a first synchronization mark that precedes a data fragment and a second synchronization mark that follows the data fragment. An attempt to identify each of the synchronization marks is made, and based upon whether the synchronization marks were identified and the quality of the identified synchronization marks, the data may be aligned using one or the other of the synchronization marks for processing. The data processing circuit providing the aforementioned synchronization mark detection and data alignment circuitry may be implemented similar to that discussed below in relation to FIG. 4. The data processing may be completed using a method such as that discussed in relation to FIG. 6.

Figure 4:
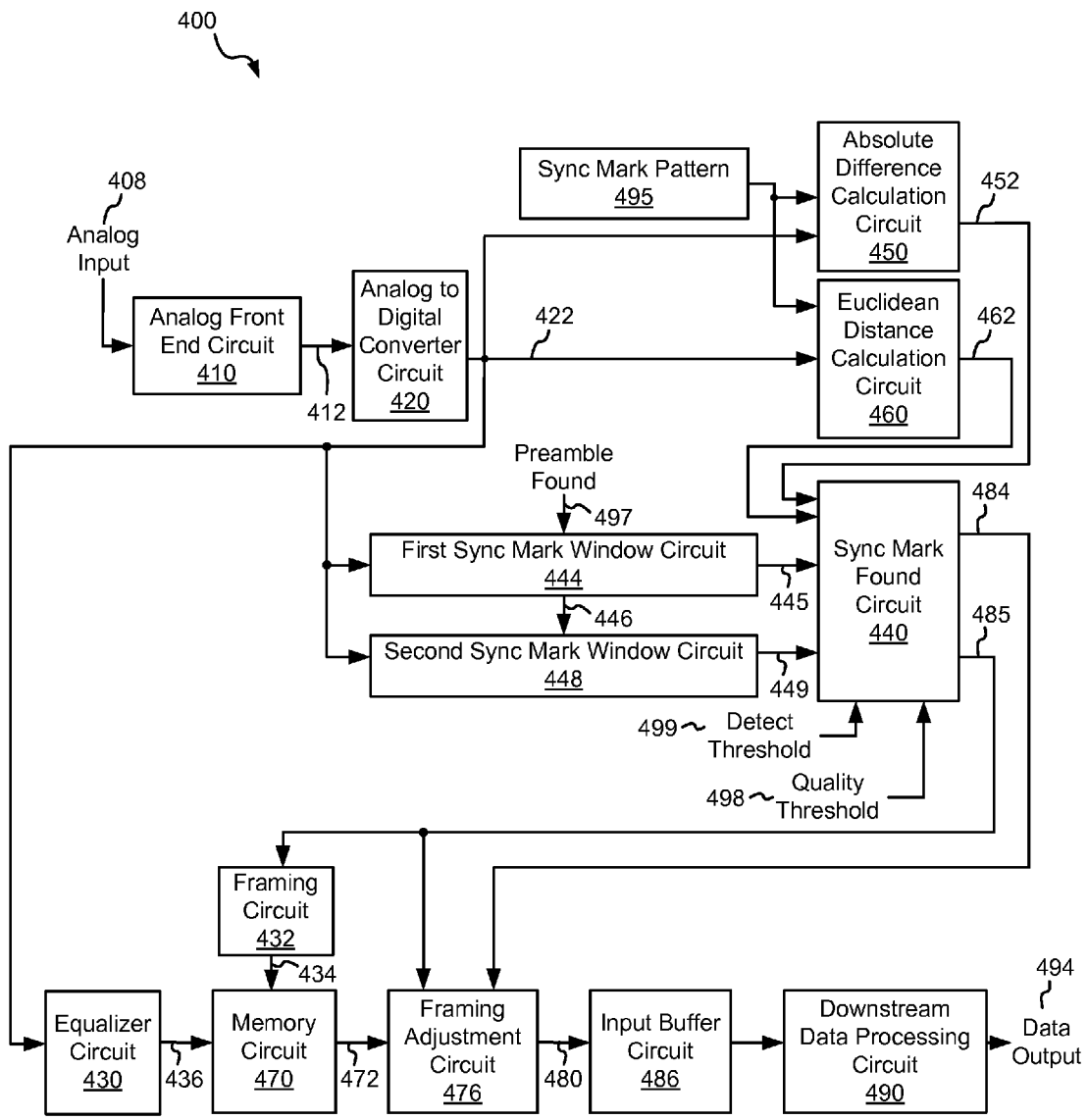
FIG. 4 shows a data processing circuit including dual sync mark detection and data alignment circuitry in accordance with one or more embodiments of the present invention.

Turning to FIG. 4, a data processing circuit 400 is shown that includes dual sync mark detection and data alignment circuitry in accordance with one or more embodiments of the present invention. Data processing circuit 400 includes an analog front end circuit 410 that receives an analog input 408. Analog input 408 may be derived from, for example, a read/write head assembly (not shown) accessing data from a storage medium. Alternatively, analog input 408 may be derived from a data transmission medium transferring from a transmitter. Based upon the disclosure provided herein, one of ordinary skill in the art will recognize a variety of sources from which analog input 408 may be derived. Analog front end circuit 410 processes analog input 408 and provides a processed analog signal 412 to an analog to digital converter circuit 420. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410.

Analog to digital converter circuit 420 converts processed analog signal 412 into a corresponding series of digital samples 422. Analog to digital converter circuit 420 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. In addition to being used for sync mark detection, digital samples 422 are provided to a downstream equalization and data processing circuitry. Such downstream data processing circuitry may rely on a first sync found output 484 and a second sync found output 485.

Digital samples 422 are provided to an equalizer circuit 430 that applies an equalization algorithm to the received input to yield an equalized output 436. Equalizer circuit 430 may be implemented as a digital finite impulse response filter as is known in the art. Based upon the disclosure provided herein, one of ordinary skill in the art will recognize a variety of equalization algorithms that may be implemented as part of equalizer circuit 430 in accordance with different embodiments of the present invention.

In addition, digital samples 422 are provided to two different pattern detection circuits that each compare a sync mark pattern 495 to yield a comparison value to yield respective comparison metrics. In particular, the two different pattern detection circuits include an absolute difference calculation circuit 450 and a Euclidean distance calculation circuit 460. Absolute difference calculation circuit 450 calculates a comparison metric 452 in accordance with the following equation:

$$\text{Comparison Metric}[k]452 = \sum_{i=0}^{n} \text{abs}(\text{Sample } 322[k-i] - \text{Pattern } 495[k-i]),$$

where k indicates an instance of the metric, i indicates a particular bit within pattern 495 and sample 422, and (n−1) is the number of bits included in the comparison. Euclidean distance calculation circuit 460 calculates a comparison metric 462 in accordance with the following equation:

$$\text{Comparison Metric}[k]462 = \sum_{i=0}^{n} \text{abs}(\text{Sample } 322[k-i] - \text{Pattern } 495[k-i])^2,$$

again where k indicates an instance of the metric, i indicates a particular bit within pattern 495 and sample 422, and (n−1) is the number of bits included in the comparison. In some embodiments of the present invention, only one or the other of the two different pattern detection circuits is implemented.

One or both of comparison metric 452 and comparison metric 462 are provided to a sync mark found circuit 440 where they are used to determine whether a sync mark has been found and the quality of the identified sync mark. A first sync mark window circuit 444 counts a number of instances of digital samples 422 since a preamble pattern has been identified (indicated by a preamble found signal 497) in digital samples 422. The number of instances of digital samples 422 from the identification of the preamble pattern defines a window during which a first sync mark is expected to be found. The window during which the first sync mark is expected is indicated by assertion of a first window output 445 that is provided to sync mark found circuit 440, and assertion of a start of counter signal 446 provided to a second sync mark window circuit 448. Second sync mark window circuit 448 counts a first number of instances of digital samples since start of counter signal 446 is asserted, and then asserts a second window output 449 for a second number of instances of digital samples 422. The second number of instances of digital samples 422 corresponds to a period when the second sync mark is expected to be found.

Figure 5:
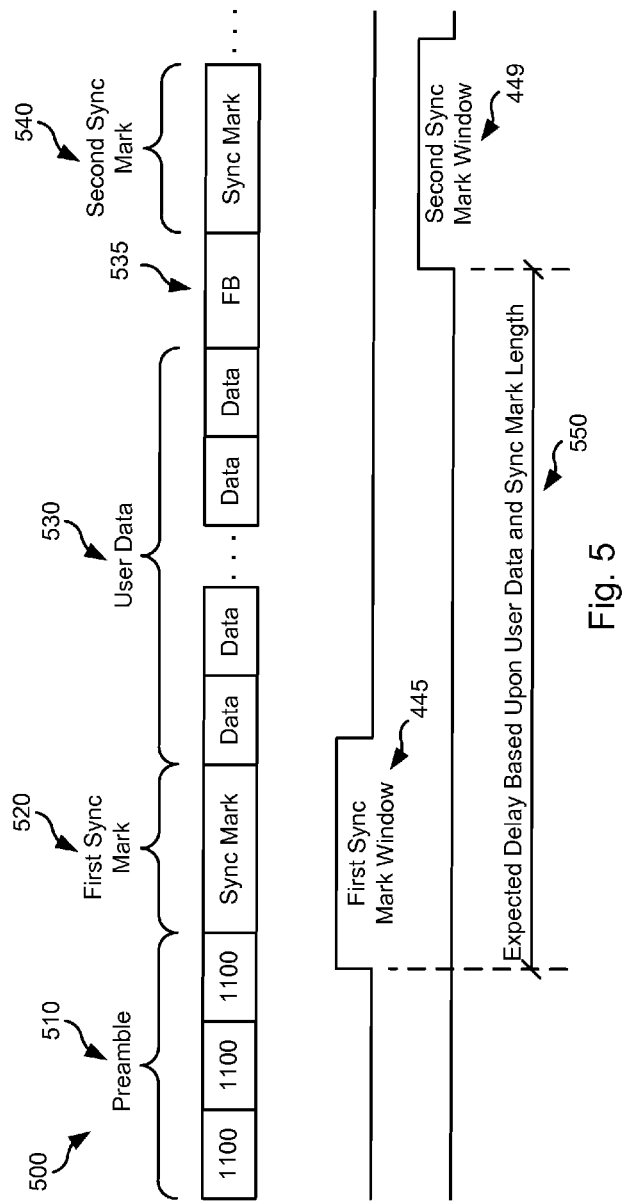
FIG. 5 is a timing diagram showing an example of windowing two sync marks in accordance with various embodiments of the present invention.

FIG. 5 shows an example 500 of asserting first window output 445 and second window output 449. As shown, a preamble pattern 510 is received and identified. As shown, the preamble pattern is a 2T pattern, but may be other preamble patterns. Once the preamble has been found, first sync mark window 445 is asserted over a period of time corresponding to when a first sync mark 520 is expected to follow preamble 510. Following first sync mark 520, user data 530 follows. After user data 530 and format bits 535, a second sync mark 540 is included. Second sync mark window 449 is asserted over a period during which second sync mark 540 is expected. The location of second sync mark window is a defined number of instances 550 of the digital samples from the start of first sync mark window 445 (i.e., corresponding to start of counter signal 446). The defined number of instances is the expected delay to receive user data 530 and the length of first sync mark 520.

Referring again to FIG. 4, sync mark found circuit 440 compares one of comparison metric 452 or comparison metric 462 with a detect threshold 499 during assertion of first window output 445 to determine whether the first sync mark is found. In addition, one of comparison metric 452 or comparison metric 462 are compared with a quality threshold 498 to determine a quality of an identified first sync mark. Detect threshold 499 is greater than quality threshold 498. Where the selected one of comparison metric 452 or comparison metric 462 is both less than detect threshold 499 and less than quality threshold 498, first sync found output 484 is provided indicating the location of the identified sync mark and that the identification is a high quality identification. Alternatively, where the selected one of comparison metric 452 or comparison metric 462 is less than detect threshold 499 and greater than quality threshold 498, first sync found output 484 is provided indicating the location of the identified sync mark and that the identification is a low quality identification. Otherwise, first sync found output 484 is provided indicating that no sync mark is found.

Detection of the second sync mark is distinct from detection of the first sync mark. In particular, detection of the second sync mark includes calculating one or both of comparison metrics 452, 462 for all sequential positions during assertion of second window output 449, and selecting the last location during assertion of second window output 449 that exhibits the lowest value comparison metric which is lower than detect threshold 499 as the location of the second sync mark by asserting second sync found output 485. Where no values of the selected comparison metric are less than detect threshold 499, no sync mark is found as indicated by not asserting second sync found output 485. To make detection of the second sync mark more accurate, two approaches may be used either separately or in conjunction depending upon the particular implementation. The first approach to improving accuracy includes to tightening detect threshold 499 for use during second window output 449 by selecting its value as the lesser of its current value or the selected comparison metric plus a defined offset value. Selecting detect threshold 499 as the selected comparison metric plus a defined offset value is only done when the selected comparison metric is less than the current threshold. The second approach to improving accuracy includes to controlling the location of the assertion of second window output 449 based upon the sync mark (i.e., the first sync mark or the second sync mark) location in another, nearby data set. Once the second sync mark is found, second sync found output 485 is provided indicating the location of the identified sync mark. Otherwise, second sync found output 485 is provided indicating that no sync mark is found.

The following pseudocode describes the operation of sync mark found circuit 440 where comparison metric 452 is used for both the first sync mark and the second sync mark. In such a case, Euclidean distance calculation circuit 460 may be eliminated.

```
If (first window output 445 is asserted){
    If (comparison metric 452 < detect threshold 499){
        If (comparison metric 452 < quality threshold 498){
            provide first sync found output 484 indicating location and
            high quality
        }
        Else {
            provide first sync found output 484 indicating location and
            low quality
        }
    }
    Else {
        provide first sync found output 484 indicating missed sync mark
    }
}
Else if (second window output 449 is asserted){
    If (comparison metric 452 < detect threshold 499){
        provide second sync found output 485 indicating location
    }
    Else {
        provide second sync found output 485 indicating missed sync mark
    }
}
```

Alternatively, the following pseudocode describes the operation of sync mark found circuit 440 where comparison metric 462 is used for both the first sync mark and the second sync mark. In such a case, absolute distance calculation circuit 450 may be eliminated.

```
If (first window output 445 is asserted){
    If (comparison metric 462 <detect threshold 499){
        If (comparison metric 462 <quality threshold 498){
            provide first sync found output 484 indicating location and
            high quality
        }
        Else {
            provide first sync found output 484 indicating location and
            low quality
        }
    }
    Else {
        provide first sync found output 484 indicating missed sync mark
    }
}
Else if (second window output 449 is asserted){
    If (comparison metric 462 <detect threshold 499){
        provide second sync found output 485 indicating location
    }
    Else {
        provide second sync found output 485 indicating missed
        sync mark
    }
}
```

As yet another alternative, the following pseudocode describes the operation of sync mark found circuit 440 where comparison metric 452 is used for the first sync mark and comparison metric 462 is used for the second sync mark.

```
If (first window output 445 is asserted){
    If (comparison metric 452 <detect threshold 499){
        If (comparison metric 452 <quality threshold 498){
            provide first sync found output 484 indicating location and
            high quality
        }
        Else {
            provide first sync found output 484 indicating location and
            low quality
        }
    }
    Else {
        provide first sync found output 484 indicating missed sync mark
    }
}
Else if (second window output 449 is asserted){
    If (comparison metric 462 <detect threshold 499){
        provide second sync found output 485 indicating location
    }
    Else {provide second sync found output 485 indicating missed sync mark
    }
```

As yet a further alternative, the following pseudocode describes the operation of sync mark found circuit 440 where comparison metric 462 is used for the first sync mark and comparison metric 452 is used for the second sync mark.

```
If (first window output 445 is asserted){
    If (comparison metric 462 < detect threshold 499){
        If (comparison metric 462 < quality threshold 498){
            provide first sync found output 484 indicating location and
            high quality
        }
        Else {
            provide first sync found output 484 indicating location and
            low quality
        }
        Else {
            provide first sync found output 484 indicating missed sync mark
        }
    }
}
```

-continued

```
Else if (second window output 449 is asserted){
    If (comparison metric 452 <detect threshold 499){
        provide second sync found output 485 indicating location
    }
    Else {
        provide second sync found output 485 indicating missed sync mark
    }
}
```

Based upon the disclosure provided herein, one of ordinary skill in the art will recognize other combinations in which comparison metric 452 and comparison metric 462 may be used in accordance with different embodiments of the present invention.

First sync found output 484 is provided to a framing circuit 432, and second sync found output 485 is provided to a framing adjustment circuit 476. Framing circuit 432 identifies the instance of equalized output 436 corresponding to the first element of the user data following the first sync mark, and provides the instance as a start output 434. Using start output 434, a memory circuit 470 stores equalized output 436 aligned with the identified first sync mark. The aligned data is provided by memory circuit 470 as a first sync aligned output 472.

Framing adjustment circuit 476 is operable to readjust first sync aligned output 472 depending upon a combination of first sync found output 484 and second sync found output 485. The previously mentioned readjustment may be done in accordance with the following table:

| First Sync Mark | Second Sync Mark | Readjustment |
| --- | --- | --- |
| Found, High Quality | N/A | No readjustment, apply normal processing |
| Found, Low Quality | Found | Selects a new location for the first user data in memory circuit by offsetting from the second sync mark by an amount corresponding to the known length of the user data plus the length of the format bits, and apply standard processing. |
| Found, Low Quality | Missed | No readjustment, apply erasure processing |
| Missed | Found | Select the location of the end of the first window output as a start point (i.e., as a first user data in the memory). Readjustment aligns the equalized output to a position calculated as the start point less the location of the second sync mark. |
| Missed | Missed | No readjustment, apply erasure processing |

As described in the preceding table, where the first sync mark is found and is of high quality, then first sync aligned output 472 is not adjusted by framing adjustment circuit 476, and framing adjustment circuit 476 provides first sync aligned output 472 as an aligned output 480. This aligned output 480 is then stored to input buffer circuit 486 where it awaits standard processing by a downstream data processing circuit 490.

Alternatively, where the first sync mark is found, but it is of low quality, and the second sync mark is found, framing adjustment circuit 476 selects a new location for the first user data in memory circuit 470 by offsetting from the second sync mark by an amount corresponding to the known length of the user data (see e.g., FIG. 5, element 530) plus the length of the format bits (see e.g., FIG. 5, element 535). Framing adjustment circuit 476 re-aligns the data in memory circuit 470 to this new location of the first user data in memory circuit 470, and provides the re-aligned data as aligned output 480. This aligned output 480 is then stored to input buffer circuit 486 where it awaits standard processing by downstream data processing circuit 490.

As yet another alternative, where the first sync mark is found, but it is of low quality, and the second sync mark is not found, framing adjustment circuit 476 does not readjust the data and framing adjustment circuit 476 provides first sync aligned output 472 as an aligned output 480. This aligned output 480 is then stored to input buffer circuit 486 where it awaits erasure processing by downstream data processing circuit 490.

As a further alternative, where the first sync mark is missed and the second sync mark is found, framing adjustment circuit 476 selects the location of the end of the end of first window output 445 as the location of the first user data in memory circuit 470. Framing adjustment circuit 476 re-aligns the data in memory circuit 470 to this new location of the first user data in memory circuit 470, and provides the re-aligned data as aligned output 480. This aligned output 480 is then stored to input buffer circuit 486 where it awaits standard processing by downstream data processing circuit 490.

Figure 6:
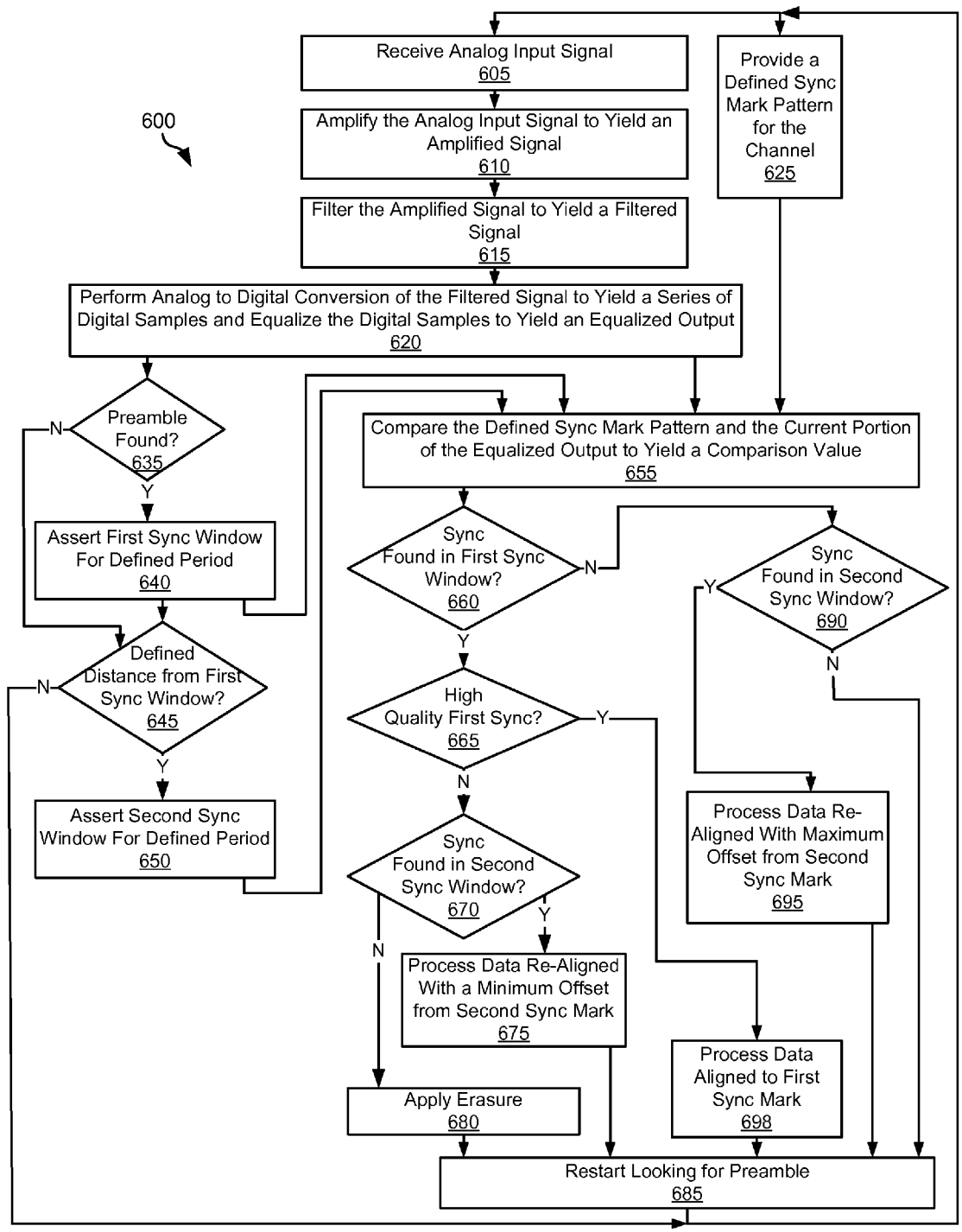
FIG. 6 is a flow diagram showing a method in accordance with one or more embodiments of the present invention including data processing relying on end of fragment synchronization mark detection and alignment.

Turning to FIG. 6, a flow diagram 600 shows a method in accordance with one or more embodiments of the present invention including data processing relying on end of fragment synchronization mark detection and alignment. Following flow diagram 600, an analog input signal is receive (block 605). The received analog input may be derived from, for example, a read/write head assembly (not shown) accessing data from a storage medium. Alternatively, the received analog input may be derived from a data transmission medium transferring from a transmitter. Based upon the disclosure provided herein, one of ordinary skill in the art will recognize a variety of sources from which the received analog input may be derived. the analog input is amplified to yield an amplified signal (block 610), and the amplified signal is filtered to yield a filtered signal (block 615). An analog to digital conversion is applied to the filtered signal to yield a series of digital samples (block 620). In parallel, a defined sync mark pattern is provided for the channel (block 625). The defined sync mark pattern is the pattern that is expected to be found in the received analog input.

It is determined whether a preamble pattern is found in the digital samples (block 635). The preamble pattern may be, for example, a repeating series of data (e.g., '001110011100111'). In some embodiments of the present invention, the preamble pattern is a 2 T pattern (i.e., '110011001100'). Based upon the disclosure provided herein, one of ordinary skill in the art will recognize a variety of patterns that may be used for the preamble pattern. Where a preamble pattern is found (block 635), a first sync window is asserted (block 640). This first sync window defines a region of data during which a first sync mark is expected to be found. Alternatively, where a preamble pattern is not found (block 635), it is determined whether the currently processing data location is a defined distance from the start of the first sync window (block 645). Where the defined distance has passed (block 645), a second sync window is asserted (block 650). This second sync window defines a region of data during which a second sync mark is expected to be found.

The defined sync mark pattern is compared with the currently processing portion of the digital samples to yield a comparison value (block 655). In some embodiments of the present invention, the comparison value is calculated as a Euclidean distance. In such embodiments, the comparison value is calculated in accordance with the following equation:

$$\text{Comparison Value} = \sum_{i=0}^{n} (\text{Equalized Output}[k-i] - \text{Defined Pattern}[k-i])^2,$$

where k indicates an instance of the metric, i indicates a particular bit within the defined pattern and the equalized output, and (n−1) is the number of bits included in the comparison. In other embodiments of the present invention, the comparison value is calculated as an absolute value. In such embodiments, the comparison value is calculated in accordance with the following equation:

$$\text{Comparison Value} = \sum_{i=0}^{n} \text{abs}(\text{Equalized Output}[k-i] - \text{Defined Pattern}[k-i])^2,$$

again where k indicates an instance of the metric, i indicates a particular bit within the defined pattern and the equalized output, and (n−1) is the number of bits included in the comparison.

The comparison value is compared with a detection threshold value to determine whether a sync mark is found within the first sync window (block 660). This involves comparing the comparison value with a detect threshold during the first sync window. Where the comparison value is less than the detect threshold during the first sync window, it is determined that a first sync is found. Where a first sync is found during the first sync window (block 660), it is determined whether the identified sync mark is a high quality sync mark (block 665). This includes comparing the comparison value with a quality threshold. Where the comparison value is less than the quality threshold, the identified sync mark is indicated as a high quality sync mark. Otherwise, it is indicated as a low quality sync mark.

Where the sync mark identified during the first sync window (block 660) and the identified sync mark is a high quality sync mark (block 665), the data aligned with the location of the identified first sync mark is processed using standard processing (block 698), and the method continues with a restart looking for the preamble (block 685). Alternatively, where the sync mark identified during the first sync window (block 660) and the identified sync mark is a low quality sync mark (block 665), it is determined whether a sync mark is found in the second sync window (block 670). This involves comparing the comparison value with a detect threshold during the second sync window. Where the comparison value is less than the detect threshold during the second sync window, it is determined that a second sync is found. Where it is determined that a sync mark is not found during the second sync window (block 670), the data is erased (block 680), and the method continues with a restart looking for the preamble (block 685). Otherwise, where it is determined that a sync mark is found during the second sync window (block 670), the equalized output is re-aligned with a minimum offset from the second sync mark and processed (block 675). The method continues with a restart looking for the preamble (block 685).

Alternatively, where a sync is not found in the first sync window (block 660), it is determined whether a sync is found in the second sync window (block 690). Where a sync is not found in the second sync window (block 690), no processing is applied and the method continues with a restart looking for the preamble (block 685). Otherwise, where a sync is found in the second sync window, the equalized output is re-aligned with a maximum offset from the second sync mark and processed (block 695). The method continues with a restart looking for the preamble (block 685).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims

What is claimed is:

1. A data processing system, the system comprising:
a sync mark identification circuit operable to:
identify a sync mark pattern in a data input within a first window of time to yield a first sync found output, wherein the sync mark within the first window of time is identified when a comparison metric is less than a threshold value;
identify the sync mark pattern in the data input within a second window of time to yield a second sync found output, wherein the sync mark within the second window of time is identified as a location in the data input where the comparison metric is the lowest value within the second window and is less than the threshold value; and
an alignment circuit operable to align a processing input derived from the data input based upon a combination of the first sync found output and the second sync found output to yield an aligned output.

2. The data processing system of claim 1, the data processing system further comprising:
a data processing circuit operable to apply a data processing algorithm to the aligned output to yield a data output.

3. The data processing system of claim 1, the data processing system further comprising:
an equalizer circuit operable to equalize the data input to yield the processing input.

4. The data processing system of claim 1, wherein the processing input is the same as the data input.

5. The data processing system of claim 1, wherein the data processing system is implemented as part of a device selected from a group consisting of: a storage device, and a communication device.

6. The data processing system of claim 1, wherein the data processing system is implemented as part of an integrated circuit.

7. The data processing system of claim 1, wherein the sync mark identification circuit includes at least one of: a Euclidean distance calculation circuit and an absolute value calculation circuit.

8. The data processing system of claim 1, wherein the location of the location of the second window of time is based on an input selected from a group consisting of:
- a location of the first window of time; and
- a location of a sync mark found outside of the data input including the sync mark pattern in the first window of time and the sync mark pattern in the second window of time.

9. The data processing system of claim 1, wherein the first sync found output indicates a location of a sync found and a quality of the sync found, wherein when the quality of the sync found is high, aligning the processing input is based only on the location of the sync found.

10. The data processing system of claim 1, wherein the first sync found output indicates a location of a sync found and a quality of the sync found, wherein when the quality of the sync found is low, aligning the processing input is based on the second sync found output and one of an end of the first window or the location of the sync found plus a defined offset.

11. The data processing system of claim 1, wherein the first sync found output indicates a missing sync found, wherein aligning the processing input is based upon the end of the first window and the second sync found.

12. The data processing system of claim 1, wherein the first window of time corresponds to a series of data preceding a data fragment, and wherein the second window of time corresponds to a series of data following the data fragment.

13. A method for data processing, the method comprising:
- comparing a data input with a sync mark pattern to yield multiple instances of a comparison metric;
- comparing at least one of the multiple instances of the comparison metric within a first window of time with a threshold value;
- asserting a first sync found output when one of the multiple instances of the comparison metric is less than the threshold value within the first window of time;
- asserting a second sync found output at a location corresponding to the lowest value of the instances of the comparison metric within a second window of time where the lowest value of the instances of the comparison metric within a second window of time is less than the threshold value; and
- aligning a processing input derived from the data input using an alignment circuit based upon a combination of the first sync found output and the second sync found output to yield an aligned output.

14. The method of claim 13, the method further comprising:
applying a data processing algorithm to the processing input to yield a data output.

15. The method of claim 13, wherein the method further comprises:
equalizing the data input to yield the processing input.

16. The method of claim 13, wherein comparing the first portion of the data input with the sync mark pattern within the first window is selected from a group consisting of: a Euclidean distance comparison, and an absolute value comparison.

17. The method of claim 13, wherein comparing the second portion of the data input with the sync mark pattern within the second window is selected from a group consisting of: a Euclidean distance comparison, and an absolute value comparison.

18. The method of claim 13, wherein the first sync found output indicates a location of a sync found and a quality of the sync found, wherein when the quality of the sync found is high, aligning the processing input is based only on the location of the sync found.

19. The method of claim 13, wherein the first sync found output indicates a location of a sync found and a quality of the sync found, wherein when the quality of the sync found is low, aligning the processing input is based on the second sync found output and one of an end of the first window or the location of the sync found plus a defined offset.

20. The method of claim 13, wherein the first sync found output indicates a missing sync found, wherein aligning the processing input is based upon the end of the first window and the second sync found.

* * * * *